US006819891B2

United States Patent
Suzuki

(12) United States Patent
(10) Patent No.: US 6,819,891 B2
(45) Date of Patent: Nov. 16, 2004

(54) OPERATION INFORMATION INPUT DEVICE, OPERATION INFORMATION INPUT AND OUTPUT DEVICE, AND IMAGE FORMING APPARATUS USING INPUT DEVICE OR INPUT/OUTPUT DEVICE

(75) Inventor: Takayuki Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/216,727

(22) Filed: Aug. 13, 2002

(65) Prior Publication Data

US 2003/0039481 A1 Feb. 27, 2003

(30) Foreign Application Priority Data

Aug. 22, 2001  (JP) ........................................ 2001-251256

(51) Int. Cl.⁷ .............................................. G03G 15/00
(52) U.S. Cl. ........................................ 399/81; 345/156
(58) Field of Search ............................... 399/1, 75, 81, 399/107; 345/156, 173; D14/388, 389

(56) References Cited

U.S. PATENT DOCUMENTS

| | | | | |
|---|---|---|---|---|
| 4,682,875 A | | 7/1987 | Suzuki | .......................... 399/8 |
| 4,899,140 A | * | 2/1990 | Ito et al. | ...................... 340/756 |
| 5,053,813 A | * | 10/1991 | Moro | ........................... 399/80 |
| 5,077,581 A | | 12/1991 | Suzuki | ........................ 399/11 |
| 5,488,453 A | * | 1/1996 | Labudde et al. | .......... 399/81 X |
| 5,832,339 A | * | 11/1998 | Inui et al. | ...................... 399/83 |
| 6,259,866 B1 | * | 7/2001 | Kabumoto et al. | ........ 399/81 X |
| 6,678,485 B1 | * | 1/2004 | Odani | .......................... 399/81 |

FOREIGN PATENT DOCUMENTS

EP          0 911 752 A2     4/1999

\* cited by examiner

Primary Examiner—Hoan Tran
(74) Attorney, Agent, or Firm—Fitzpatrick, Cella, Harper & Scinto

(57) ABSTRACT

Provided is an operation information input/output device having a first operation information input unit for inputting operation information about the device and a second operation information input unit for inputting operation information about the device. The first and second operation information input units are arranged so that the angle formed between the operation surfaces of the first and second operation information input units is approximately equal to a right angle. The first and second operation information input units are configured so that operations performed with the first operation information input unit and operations performed with the second operation information input unit are identical to each other.

31 Claims, 6 Drawing Sheets

OPERATION INFORMATION INPUT DEVICE, OPERATION INFORMATION INPUT AND OUTPUT DEVICE, AND IMAGE FORMING APPARATUS USING INPUT DEVICE OR INPUT/OUTPUT DEVICE

BACKGROUND OF THE INVENTION

1. Field of the Invention

The present invention relates to an operation information input device for inputting operation information to an apparatus and also relates to an operation information input and output device. More particularly, the present invention relates to an input device or an input and output device used in an image forming apparatus such as a copying machine or a printer.

2. Related Background Art

The majority of user interface portions (operation information input and output portions) of conventional image forming apparatuses such as copying machines are provided in a generally horizontal position on upper surfaces of the image forming apparatuses such that non-handicapped adult persons in a standing posture can operate the apparatus with facility.

The above-described conventional user interface portions have a drawback in that a child low in stature or a person in a sitting posture using a wheelchair or the like has difficulty in operating the image forming apparatus since input keys and a display in the interface portion are formed so as to face upward and can be seen by such a person only with great difficulty.

SUMMARY OF THE INVENTION

An object of the present invention is to provide an information input device or an information input and output apparatus having the above-described user interface portion designed by considering disabilities (barrier-free designed), i.e., designed so as to have improved operability and viewability.

To achieve the above-described object, according to a preferred embodiment of the present invention, there is provided an operation information input device comprising: a first operation information input means for inputting operation information about the device; and a second operation information input means for inputting operation information about the device, the device being characterized in that the first operation information input means and the second operation information input means are arranged so that the angle formed between an operation surface of the first operation information input means and an operation surface of the second operation information input means is approximately equal to a right angle, and that the first operation information input means and the second operation information input means are configured so that an operation performed with the first operation information input means and an operation performed with the second operation information input means are identical to each other.

According to another preferred embodiment of the present invention, there is provided an operation information input and output device comprising: a first operation information input and output means having an input portion for inputting operation information about the device and an output portion for outputting the information; and a second operation information input and output means having an input portion for inputting operation information about the device and an output portion for outputting the information, the device being characterized in that the first operation information input and output means and the second operation information input and output means are arranged so that the angle formed between an operation surface of the first operation information input and output means and an operation surface of the second operation information input and output means is approximately equal to a right angle, and that the first operation information input and output means and the second operation information input and output means are configured so that an operation performed with the first operation information input and output means and an operation performed with the second operation information input and output means are identical to each other.

DESCRIPTION OF THE PREFERRED EMBODIMENTS

Embodiment 1

Figure 1:
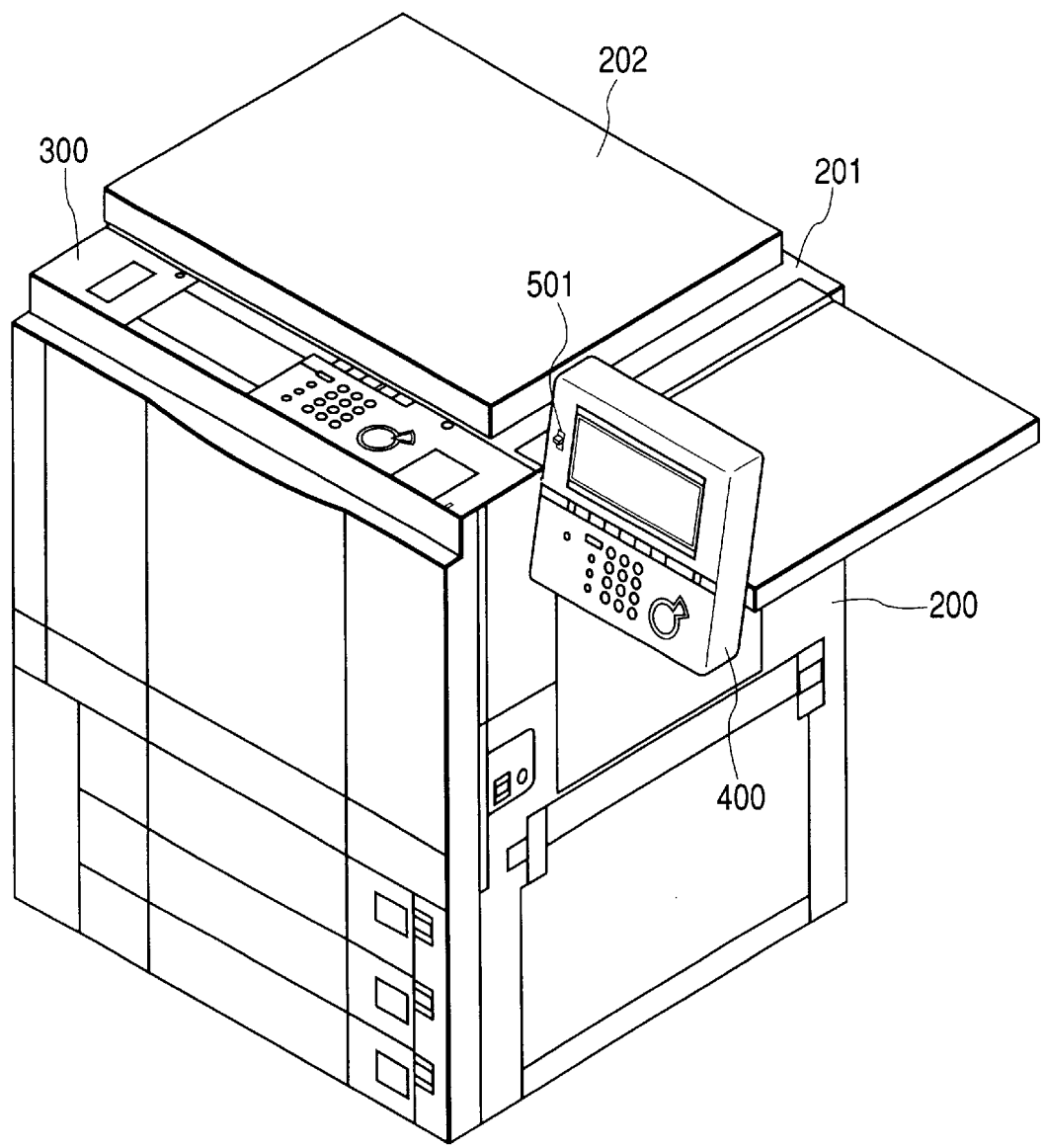
FIG. 1 is a schematic perspective view of a copying machine according to an embodiment of the present invention.
Figure 2:
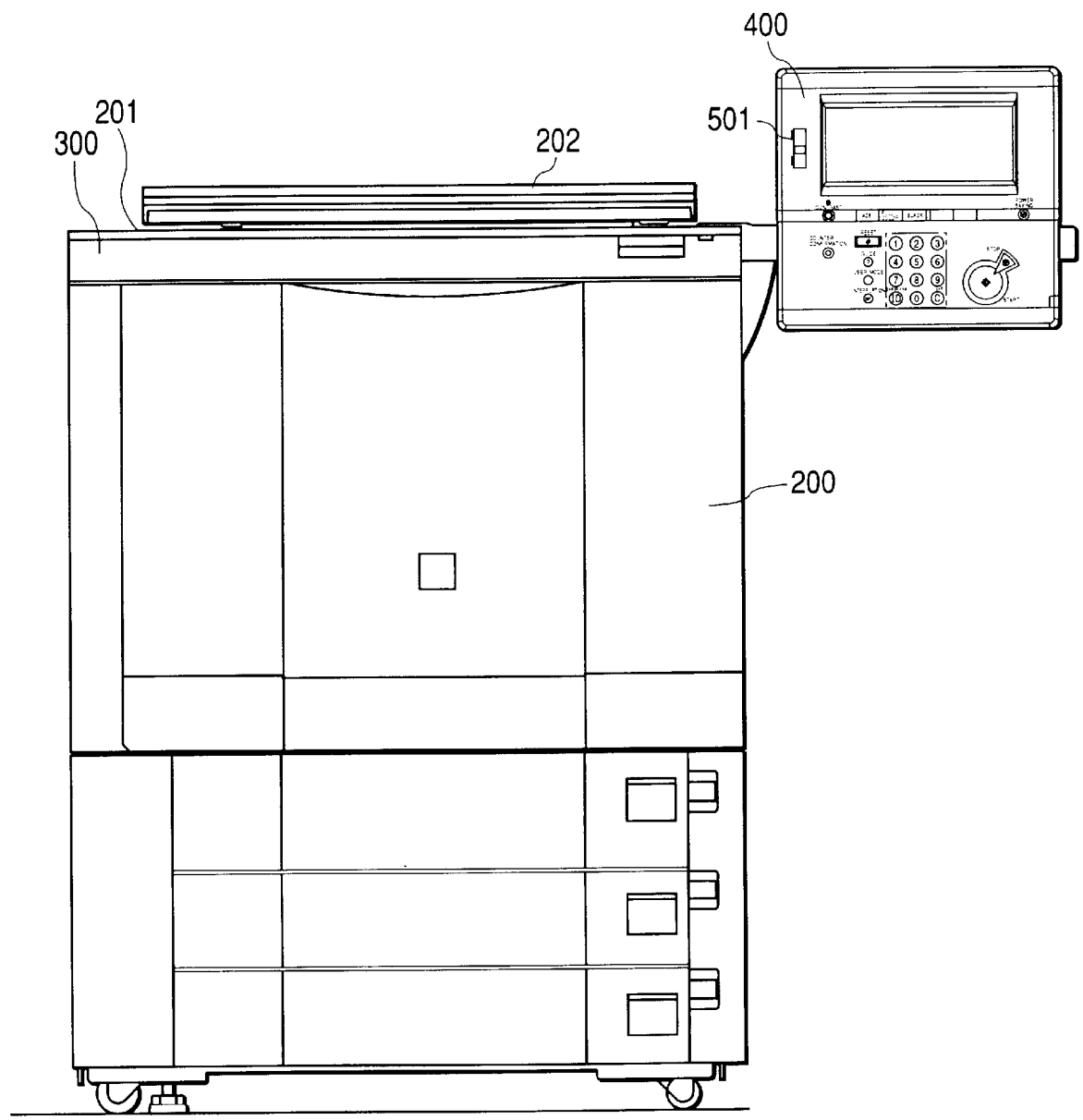
FIG. 2 is a front view of the copying machine according to the embodiment.
Figure 3:
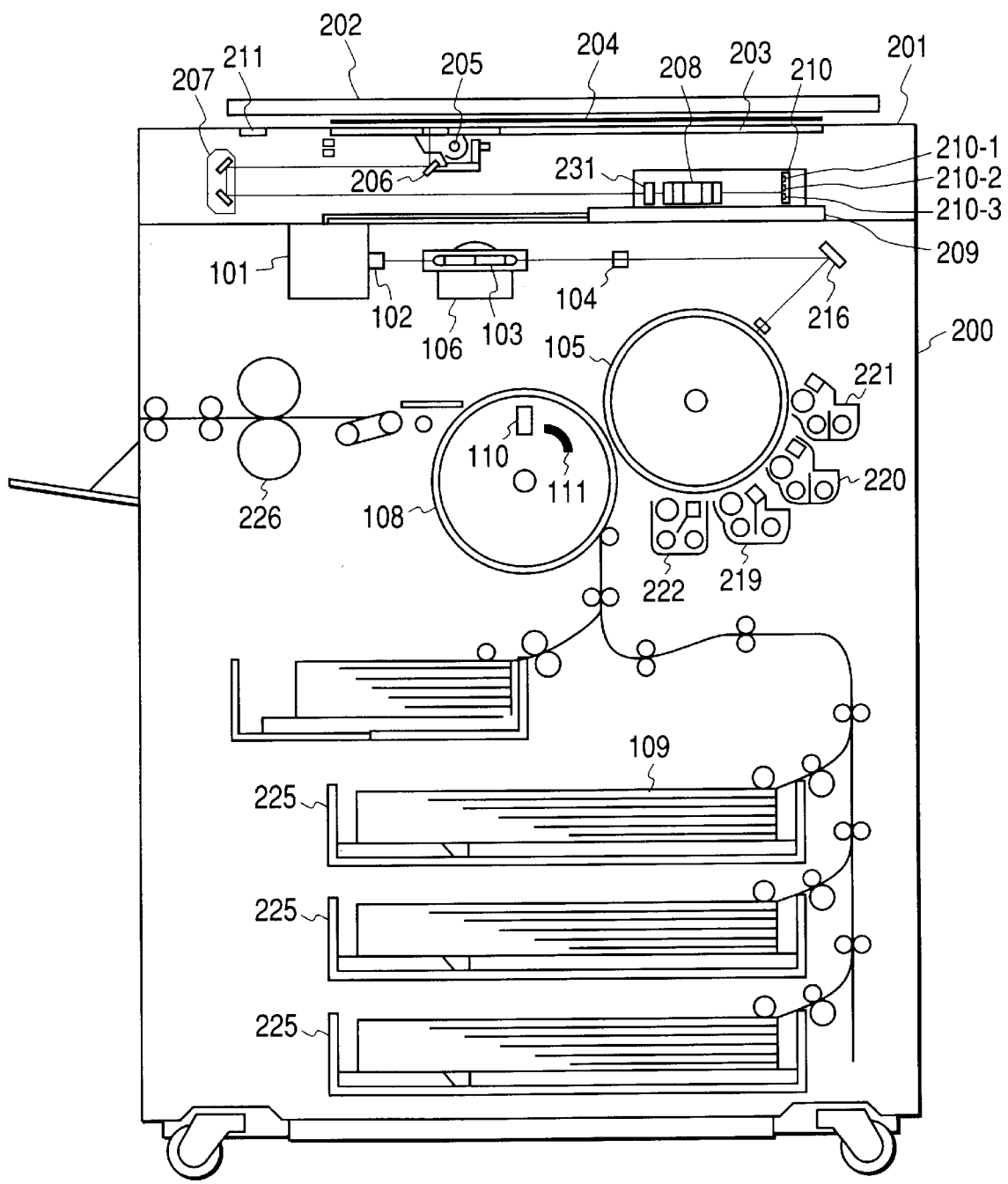
FIG. 3 is a main sectional view (longitudinal sectional front view) of the copying machine according to the embodiment.
Figure 4:
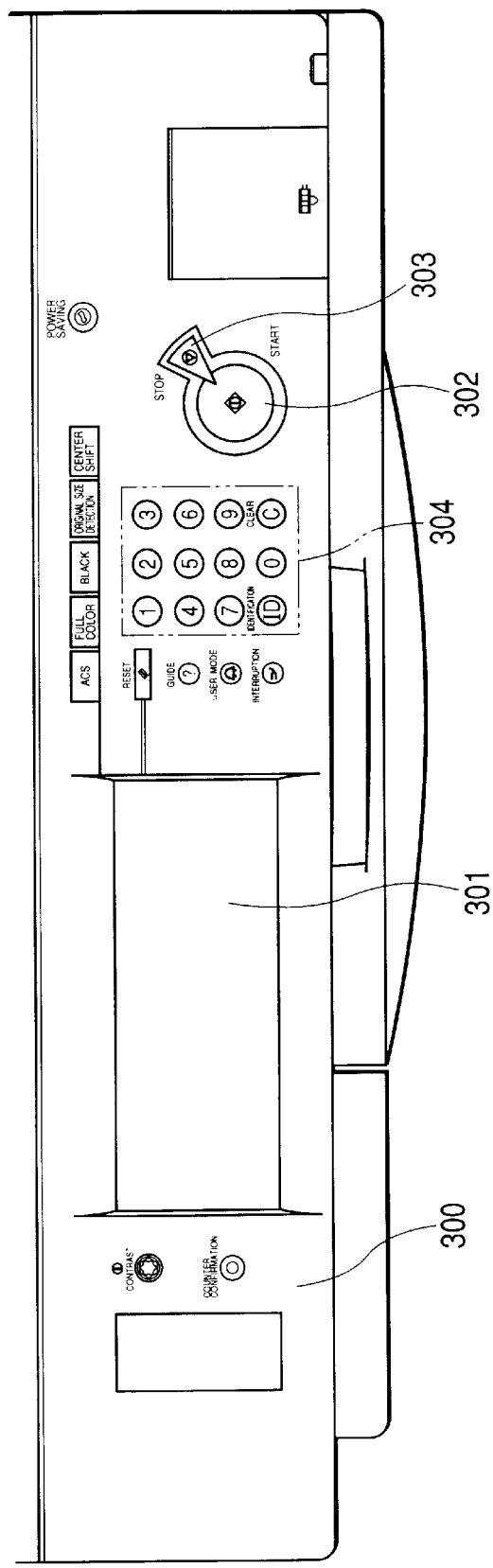
FIG. 4 is a plan view of a first operation information input/output unit.
Figure 5:
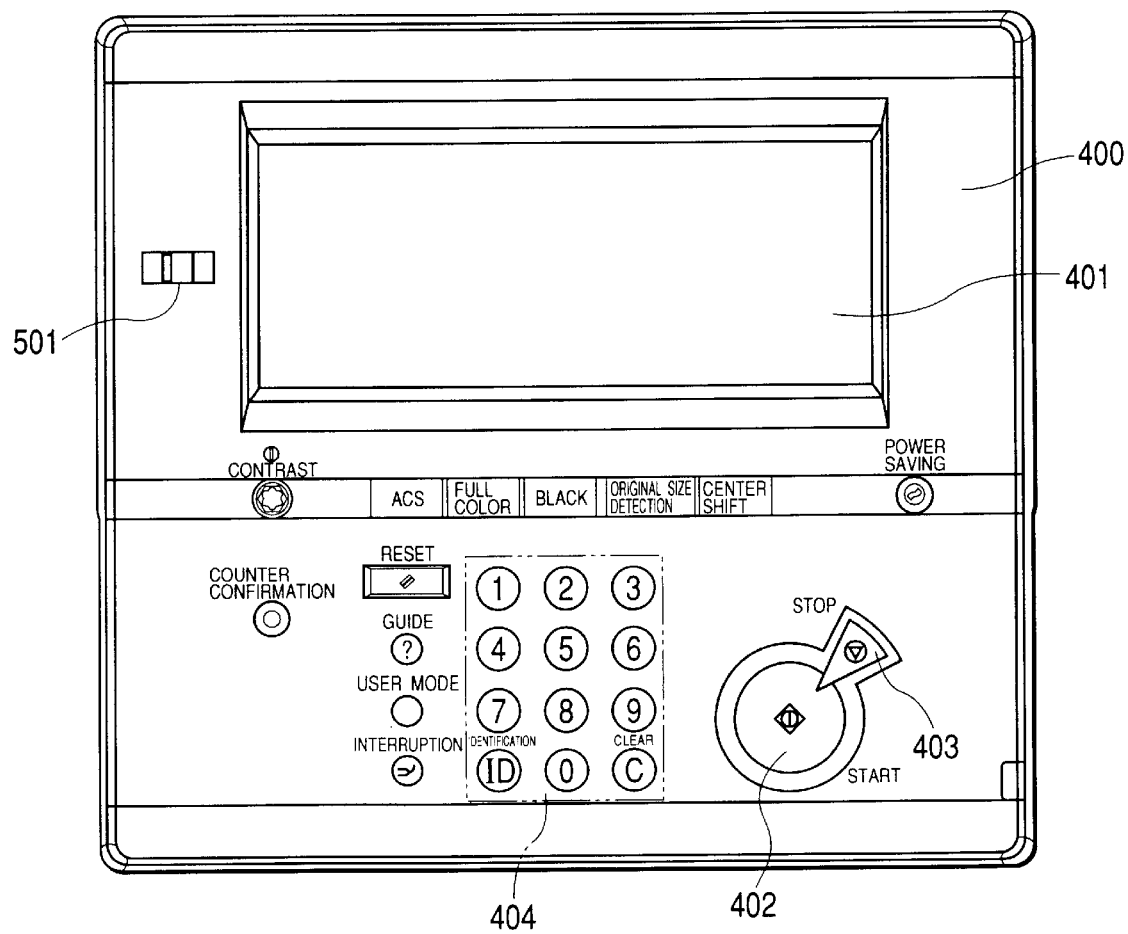
FIG. 5 is a front view of second operation information input/output unit.

Embodiments of the present invention will be described below with reference to the accompanying drawings. FIG. 1 is a schematic perspective view of a copying machine which is an embodiment of the image forming apparatus in accordance with the present invention; FIG. 2 is a front view of the copying machine; FIG. 3 is a main sectional view (longitudinal sectional front view) of the copying machine; FIG. 4 is a plan view of a first user interface unit provided in a top surface portion of the main body of the copying machine; and FIG. 5 is a front view of a second user interface unit provided on the right-hand side of the copying machine.

(1) Referring to FIGS. 1 to 3 schematically showing the construction of the entire copying machine, an image scanner unit (or an image scanner portion) 201 is arranged to read an original and to perform digital signal processing on an image signal obtained by reading.

A printer unit (or a printer portion) 200 is arranged to form on a print sheet a full-color image corresponding to an original image read by the image scanner 201, and to output the print sheet.

The first user interface unit (or the first user interface portion) indicated by 300 is placed generally horizontally in a top surface of the main body of the copying machine. Through the first user interface unit 300, printing conditions including the number of copies are set in the copying machine, and the copying machine is operated. Also, the first user interface unit 300 has a liquid crystal display (LCD) portion on which various sorts of information about the machine are displayed.

The second user interface unit (or the second user interface portion) indicated by 400 is placed generally vertically on the right-hand side of the main body of the copying machine and has the same functions as the first user interface unit 300.

The first user interface unit 300 and the second user interface unit 400 can be switched by a changeover switch 501 which is provided on the second user interface unit 400, and which is vertically operable. A user operates the switch 501 to select one of the first and second user interface units, whichever is easier to use.

On the basis of information (the number of copies, color/black and white, image processing, etc.) set by a user through the first user interface unit 300 and the second user interface unit 400, the printer 200 and the image scanner 201 operate as described below to output a desired image.

Referring mainly to FIG. 3, in the image scanner unit 201, an original 204 which is placed on an original table glass 203 and which is under an original pressing plate 202 is irradiated with light from a halogen lamp 205. Light reflected from the original travels view mirrors 206 and 207 and forms an image on a three-line sensor (hereinafter referred to as a CCD) 210 through a lens 208. An infrared cut filter 231 is provided to the lens 208.

The CCD 210 color-decomposes optical information from the original to read full-color information: red (R), green (G), and blue (B) components, and sends the read information to a signal processing unit 209.

In the CCD 210, each of sensor arrays 210-1, 210-2, and 210-3 for reading the respective color components is formed of 500 pixels. When the sensor arrays read an A3-size original, which is the largest in size among originals mountable on the original table glass 203, the A3-size original can be read at a resolution of 400 dpi with respect to the 297 mm shorter side of the original.

The halogen lamp 205, the mirror 206 and the mirror 207 are mechanically moved in a direction (hereinafter referred to as "sub-scanning direction") perpendicular to the direction of electrical scanning on the line sensor (hereinafter referred to as "main scanning direction"), the halogen lamp 205 and the mirror 206 being moved at a velocity v, and the mirror 207 being moved at a velocity of ½v, thereby scanning the entire original surface.

A standard white plate 211 is provided to generate data for correction of data read by the R, G, and B sensors 210-1 to 210-3. The standard white plate 211 has a reflecting characteristic generally uniform with respect to the visible light region and is visually recognized in white. Visible sensor output data from the sensors 210-1 to 210-3 is corrected by using this standard white plate 211.

Read signals are electrically processed in the image signal processing unit (or the image signal processing portion) 209 to be decomposed into magenta (M), cyan (C), yellow (Y) and black (BK) components, which are sent to the printer unit 200. One of the M, C, Y and BK components is sent to the printer 200 in one cycle of original scanning in the image scanner unit 201, and one print output is completed with a total of four cycles of original scanning.

M, C, Y, and BK image signals sent from the image scanner unit 201 are supplied to a laser driver 101, which drives a semiconductor laser 102 in accordance with a signal modulated with each image signal. A laser beam from the laser 102 is moved along the main scanning direction by a polygon mirror 103 driven and rotated by a polygon motor 106, passes through a f-θ lens 104, is reflected by a mirror 216, and reaches a photosensitive drum 105, thereby scanning the surface of the photosensitive drum 105.

Four developing devices: a magenta developing device 219, a cyan developing device 220, a yellow developing device 221, and a black developing device 222 are alternately brought into contact with the photosensitive drum 105 to develop M, C, Y, and BK electrostatic latent images formed on the photosensitive drum 105 by corresponding toner.

A transfer drum 108 is linked to the photosensitive drum 105 by a gear to rotate by following the photosensitive drum 105. A sheet 109 supplied from a sheet cassette 225 is wrapped around the transfer drum 108 and the toner image developed on the photosensitive drum 105 is transferred to the sheet. A TOP sensor 110 and a sensor light shielding flag 111 that is rotated following the transfer drum 108 are placed inside the transfer drum 108. A TOP signal generated by the TOP sensor 110 when the light shielding flag 111 shields the TOP sensor 110 is used as a reference signal for the rotational position of the transfer drum 108. In synchronization with this signal, the printer 200 requests the image scanner to output the image signal to form the image in each color in a predetermined position on the transfer drum 108, thus adjusting the positions of writing in the different colors.

After the four colors M, C, Y, and BK have been successively transferred onto the sheet in the above-described manner, the sheet is passed through a fixing unit 226 to fix the toner image thereon and is thereafter discharged to the outside of the machine body.

The operation of the copying machine in this embodiment has been roughly explained.

(2) The first and second user interface units 300 and 400 (operation information input/output means) of the present invention will now be described in detail.

Liquid crystal displays (LCD) 301 and 401 which are examples of two display means respectively provided as information output means in the first user interface unit 300 shown in FIG. 4 and the second user interface unit 400 shown in FIG. 5 are identical to each other. Two groups of information displayed on the two LCD displays have the same contents and are displayed in the same form. Also, start keys 302 and 402, stop keys 303 and 403, ten-key clusters (numeral keys) 304 and 404, and other groups of keys respectively identical to each other are used as information input means. The layouts of these keys on the operation surfaces of the two interface units are essentially the same. This arrangement was made by considering the possibility that if the used keys, the key layouts, the displays and the like were to differ between the first and second user interface units 300 and 400, a user would confuse operations related to the keys and the displays. This arrangement ensures that a user can easily understand that the first and second user interface units 300 and 400 are the same and are operated in the same manner, thus improving the usability.

The first user interface unit 300 is placed generally horizontally in the top surface of the main body of the copying machine, as shown in FIGS. 1, 2, and 4, while the second user interface unit 400 is placed generally vertically on the right-hand side of the main body of the copying machine, as shown in FIGS. 1, 2, and 5. Since the first and second user interface units 300 and 400 can be operated in the same manner, a user generally uses either of the two user interface units. Therefore the changeover switch 501 for switching between the first and second interface units 300 and 400 is provided.

For example, in FIGS. 1 and 2, a lug of this changeover switch 501 is turned to the upper side to enable use of the second user interface unit 400, and is turned to the lower side to enable use of the first user interface unit 300.

In conventional copying machines, user interface units are placed generally horizontally in the upper surfaces of the copying machines, and the height of the operation surface of the interface unit from the floor surface is about 1 m. Also in this embodiment, the first user interface unit 300 is placed at a height of about 1 m from the floor surface, as is that in the conventional arrangement.

Ordinarily, the height of the user interface unit of the copying machine including the first user interface unit 300 is set to about 0.9 to 1 m since the non-handicapped adult persons in a standing posture can operate the copying machine most easily at this height. However, a child low in stature or a person in a sitting posture using a wheelchair or the like has difficulty in seeing the display 301 and the input keys 302 to 304 of the first user interface unit 300 and therefore in operating the machine.

According to the present invention, therefore, the second user interface unit 400 is provided to improve the facility with which a child low in stature or a person in a sitting posture using a wheelchair or the like operates the machine. The second user interface unit 400 is placed generally vertically on the right-hand side of the main body of the copying machine, as shown in FIGS. 1, 2, and 5. Visual recognition of the second user interface unit 400 from the front side of the main body of the copying machine is thus made easier, thereby improving the facility with which a child or a person in a sitting posture using a wheelchair or the like operates the machine.

In the first user interface unit 300, the display 301, the start key 302, the stop key 303, the ten-key cluster 304 and other input keys are arranged in a laterally extended layout along a horizontal direction. In the second user interface unit 400, the display 401, the start key 402, the stop key 403, the ten-key cluster 404 and other input keys are arranged in a longitudinally extended layout along a vertical direction. This is because if the first user interface unit 300 were to have a longitudinally extended configuration, the distance between the front side of the machine and the original table glass 203 or the original pressing plate 202 in the direction toward the rear side of the machine would be so large that it would be considerably difficult for a child or a person in a sitting posture using a wheelchair or the like to perform operations over the original table. If the second user interface unit 400 were to have a laterally extended configuration, the distance between the interface unit and the original table glass 203 or the original pressing plate 202 along a left-right direction would be so large that the operability would be reduced. Also, the area on the floor occupied by the copying machine would be increased. Therefore, the second user interface unit 400 is provided in the vertically extended configuration.

The start key 402, the stop key 403, the ten-key cluster 404 and other input keys of the second user interface unit 400 are placed substantially at the same height from the floor surface as the first user interface unit 300. This is because the facility with which a child or a person in a sitting posture using a wheelchair or the like operates and visually recognizes the interface unit 300 is maximized at this height. Also this height was selected by considering the facility of operation even at the time when a user in a standing posture uses one of the first and second user interface units 300 and 400 by switching between these units.

The changeover switch 501 for switching between the first and second user interface units 300 and 400 is also placed at substantially the same height as the first and second user interface units 300 and 400. This is because if the height of the first user interface unit 300 and the height of the changeover switch 501 are substantially equal to each other, an operation for changing the changeover switch 501 and operations on the first user interface unit 300 can be successively performed in a shortest time with efficiency. Also as to the second user interface unit 400, operations can be performed in a shortest time with efficiency.

Thus, the first user interface unit 300 and the second user interface unit 400 are set substantially equal in height to each other.

Figure 6:
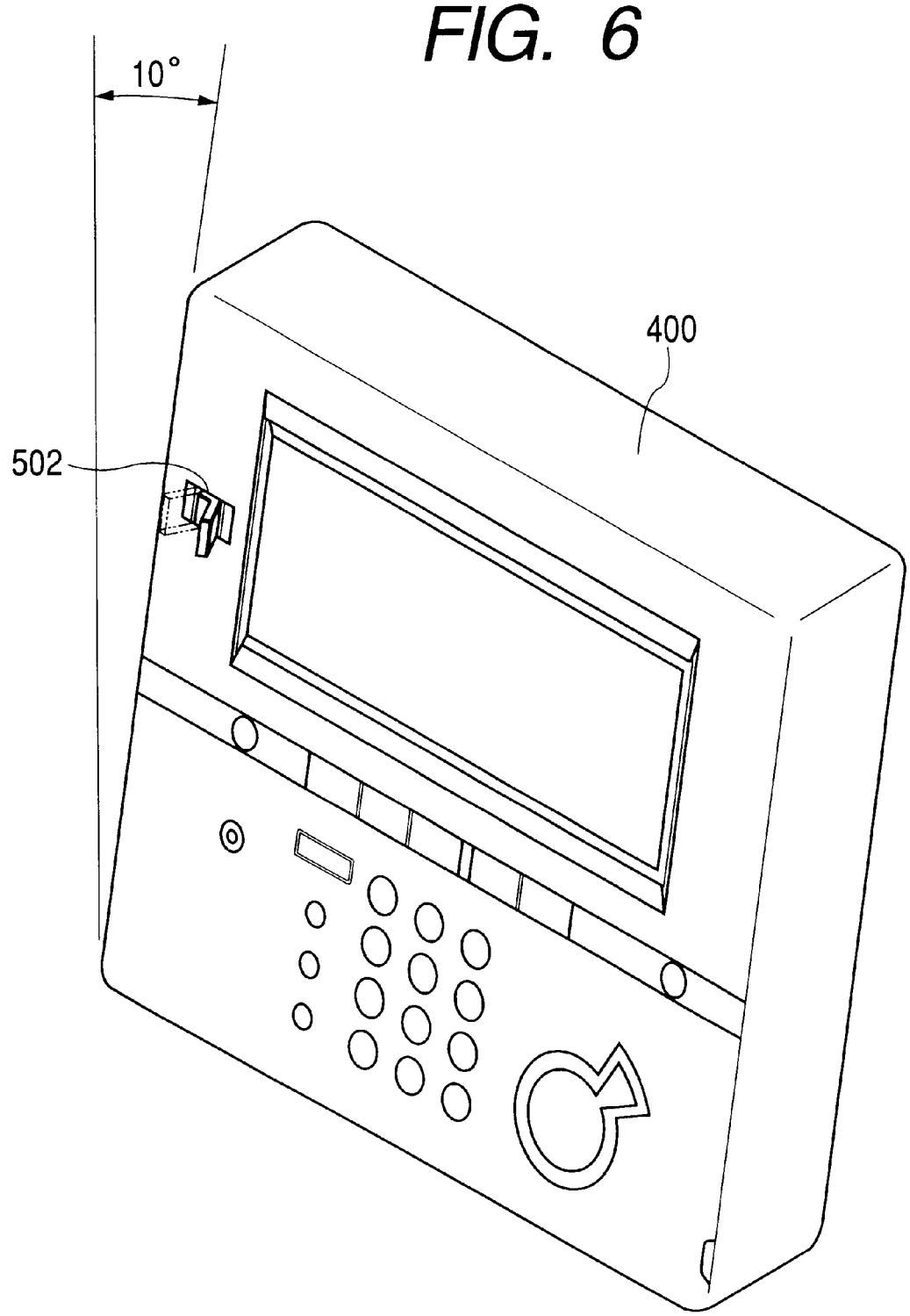
FIG. 6 is a perspective view of a second operation information input/output unit in a second embodiment of the present invention.

Preferably, the operation surface of second user interface unit 400 is inclined, for example, by about 10° from the vertical line to face slightly upwardly, as shown in FIG. 6. This setting is made for the purpose of enabling a non-handicapped adult person to operate the changeover switch 501 more easily and to see the operation surface of the second user interface unit 400 more easily.

The changeover switch 501 is placed on the second user interface unit 400 at a position closer to the first user interface unit 300. This position was selected by considering the facility of switching between the first and second user interface units 300 and 400 by each of a person using the first user interface unit 300 and a person using the second user interface unit 400. If the changeover switch 501 were to exist on the first user interface unit 300, there would be a fear that a user such as a child or a person in a sitting posture could not recognize the switch.

As described above, the first user interface unit 300, the second user interface unit 400 and the changeover switch 501 are set substantially equal in height to each other, and the changeover switch 501 is placed between the first and second user interface units 300 and 400, thereby enabling an operation for changing the changeover switch 501 and operations on each user interface unit to be successively performed in a shortest time with efficiency.

Embodiment 2

In Embodiment 1, the changeover switch 501 used for switching between the user interface units 300 and 400 is of the type having the switch key turned along a vertical direction as shown in FIG. 1. Alternatively, a switch key 502 may be turned to the left or right to enable use of the user interface unit in the direction in which the key is turned, thereby enabling a user to easily recognize which one of the user interface units is usable according to the direction of the switch key 502 without having to recognize lighting in the LCD display or the keys in the user interface unit or any other indication means.

What is claimed is:

1. An operation information input device comprising:
   first operation information input means for inputting operation information about the device; and
   second operation information input means for inputting operation information about the device,
   wherein said first operation information input means and said second operation information input means are arranged so that the angle formed between an operation surface of said first operation information input means and an operation surface of said second operation information input means is approximately equal to a right angle, and
   wherein said first operation information input means and said second operation information input means are configured so that an operation performed with said first operation information input means and an operation performed with said second operation information input means are identical to each other.

2. A device according to claim 1, wherein said first operation information input means is arranged so that its operation surface is generally horizontal.

3. A device according to claim 2, wherein said first operation information input means and said second operation information input means are arranged at substantially the same height.

4. An image forming apparatus comprising:
an operation information input device as set forth in claim 1; and
image forming means for forming an image on the basis of operation information from said operation information input device.

5. An operation information input and output device comprising:
first operation information input and output means having an input portion for inputting operation information about the device and an output portion for outputting the information; and
second operation information input and output means having an input portion for inputting operation information about the device and an output portion for outputting the information,
wherein said first operation information input and output means and said second operation information input and output means are arranged so that an angle formed between an operation surface of said first operation information input and output means and an operation surface of said second operation information input and output means is approximately equal to a right angle, and
wherein said first operation information input and output means and said second operation information input and output means are configured so that an operation performed with said first operation information input and output means and an operation performed with said second operation information input and output means are identical to each other.

6. A device according to claim 5, wherein said first operation information input and output means is arranged so that its operation surface is generally horizontal.

7. A device according to claim 6, wherein said first operation information input and output means and the input portion of said second operation information input and output means are arranged at substantially the same height.

8. A device according to claim 5, wherein the output portion of said first operation input and output means and the output portion of said second operation input and output means are capable of performing the same display.

9. An image forming apparatus comprising:
an operation information input device as set forth in claim 5; and
image forming means for forming an image on the basis of operation information from said operation information input and output device.

10. An operation information input device comprising:
first operation information input means capable of inputting operation information about the device, said first operation information input means being arranged so that its operation surface is generally upward; and
second operation information input means capable of inputting operation information about the device, said second operation information input means being arranged so that its operation surface is generally frontal,
wherein said first operation information input means has a first input key portion for inputting operation information, and said second operation information input means has a second input key portion for inputting operation information.

11. A device according to claim 10, wherein said first input key portion has a plurality of keys, said second input key portion has a plurality of keys, and arrangement of the plurality of the keys of said first input key portion is substantially the same as arrangement of the plurality of the keys of said second input key portion.

12. A device according to claim 10, wherein said first input key portion has a plurality of keys, said second input key portion has a plurality of keys, and arrangement of at least part of the plurality of the keys of said first input key portion is substantially the same as arrangement of at least a part of the plurality of the keys of said second input key portion.

13. A device according to claim 10, further comprising switch means for switching between said first operation information input means and said second operation information input means.

14. A device according to claim 13, wherein said switch means is provided at a position one said second operation input means closer to said first operation information input means.

15. A device according to claim 14, wherein said switch means is provided at substantially the same height as said first operation information input means.

16. A device according to claim 13, wherein said switch means has a movable switch which is configured so as to move toward one of said operation information input means when said one of said operation information input means is selected to be used.

17. An operation information input and output device comprising:
first operation information input and output means having an input portion for inputting operation information about the device and an output portion for outputting the information, said first operation information input means being arranged so that its operation surface is generally upward with respect to the device; and
second operation information input and output means having an input portion for inputting operation information about the device and an output portion for outputting the information, said second operation information input and output means being arranged so that its operation surface is generally frontal with respect to the device,
wherein said first operation information input and output means has a first input key portion for inputting operation information, and said second operation information input and output means has as second input key portion for inputting operation information.

18. A device according to claim 17, wherein said first input key portion has a plurality of keys, said second input key portion has a plurality of keys, and arrangement of the plurality of the keys of said first input key portion is substantially the same as arrangement of the plurality of the keys of said second input key portion.

19. A device according to claim 17, wherein said first input key portion has a plurality of keys, said second input key portion has a plurality of keys, and arrangement of at least a part of the plurality of the keys of said first input key portion is substantially the same as arrangement of at least a part of the plurality of the keys of said second input key portion.

20. A device according to claim 17, further comprising switch means for switching between said first operation information input and output means and said second operation information input and output means.

21. A device according to claim 20, wherein said switch means is provided at a position on said second operation information input and output means closer to said first operation information input and output means.

22. A device according to claim 21, wherein said switch means is provided at substantially the same height as said first operation information input and output means.

23. A device according to claim 20, wherein said switch means has a movable switch which is configured so as to move toward one of said operation information input and output means when said one of said operation information input and output means is selected to be used.

24. A device according to claim 17, wherein, in said first operation information input and output means, the input portion and the output portion are arranged along a horizontal direction as seen from the front side of the device, and wherein, in said second operation information input and output means, the input portion and the output portion are arranged along a vertical direction.

25. A device according to claim 24, wherein said first operation information input and output means and the input portion of said second operation information input and output means are arranged at substantially the same height.

26. An image forming apparatus comprising:
first operation information input means capable of inputting operation information about said image forming apparatus, said first operation information input means being arranged so that its operation surface is generally upward with respect to said image forming apparatus;
second operation information input means capable of inputting operation information about said image forming apparatus, said second operation information input means being arranged so that its operation surface is generally frontal with respect to said image forming apparatus; and
image forming means for forming an image on a recording material in accordance with operation information inputted from said first operation information input means or said second operation information input means,
wherein said first operation information input means has a first input key portion for inputting operation information, and said second operation information input means has a second input key portion for inputting operation information.

27. An image forming apparatus comprising:
first operation information input and output means having an input portion for inputting operation information about said image forming apparatus and an output portion for outputting the information, said first operation information input and output means being arranged so that its operation surface is generally upward with respect to said image forming apparatus;
second operation information input and output means having an input portion for inputting operation information about said image forming apparatus and an output portion for outputting the information, said second operation information input and output means being arranged so that its operation surface is generally frontal with respect to said image forming apparatus; and
image forming means for forming an image on a recording material in accordance with operation information inputted from said first operation information input and output means or said second operation information input and output means,
wherein said first operation information input and output means has a first input key portion for inputting operation information, and said second operation information input and output means has a second input key portion for inputting operation information.

28. An image forming apparatus comprising:
a first operation information input portion capable of inputting operation information about said image forming apparatus, said first operation information input portion being arranged so that its operation surface is generally upward with respect to said image forming apparatus;
a second operation information input portion capable of inputting operation information about said image forming apparatus, said second operation information input portion being arranged so that its operation surface is generally frontal with respect to said image forming apparatus; and
image forming means for forming an image on a recording material in accordance with operation information inputted from said first operation information input portion or said second operation information input portion,
wherein said first operation information input portion has a plurality of keys for inputting operation information,
said second operation information input portion has a plurality of keys for inputting operation information, and
arrangement of the plurality of the keys of said first operation information input portion is substantially the same as arrangement of the plurality of the keys of said second operation information input portion.

29. An image forming apparatus comprising:
a first operation information input portion capable of inputting operation information about said image forming apparatus, said first operation information input portion being arranged so that its operation surface is generally upward with respect to said image forming apparatus;
a second operation information input portion capable of inputting operation information about said image forming apparatus, said second operation information input portion being arranged so that its operation surface is generally frontal with respect to said image forming apparatus; and
image forming means for forming an image on a recording material in accordance with operation information inputted from said first operation information input portion or said second operation information input portion,
wherein said first operation information input portion has a plurality of keys for inputting operation information,
said second operation information input portion has a plurality of keys for inputting operation information, and
arrangement of at least a part of the plurality of the keys of said first operation information input portion is substantially the same as arrangement of at least a part of the plurality of the keys of said second operation information input portion.

30. An image forming apparatus comprising:
first operation information input means capable of inputting operation information about said image forming apparatus, said first operation information input means being arranged so that its operation surface is generally upward with respect to said image forming apparatus;
second operation information input means capable of inputting operation information about said image forming apparatus, said second operation information input means being arranged so that its operation surface is generally frontal with respect to said image forming apparatus; and image forming means for forming an image on a recording material in accordance with operation information inputted from said first operation information input means or said second operation information input means, wherein said first operation information input means has a first input key portion for inputting operation information, and said second operation information input means has a second input key portion for inputting operation information, and switch means for switching between said first operation information input means and said second operation information input means.

31. An image forming apparatus comprising:

first operation information input and output means having an input portion for inputting operation information about said image forming apparatus and an output portion for outputting the information, said first operation information input and output means being arranged so that its operation surface is generally upward with respect to said image forming apparatus;

second operation information input and output means having an input portion for inputting operation information about said image forming apparatus and an output portion for outputting the information, said second operation information input and output means being arranged so that its operation surface is generally frontal with respect to said image forming apparatus; and image forming means for forming an image on a recording material in accordance with operation information inputted from said first operation information input and output means or said second operation information input and output means, wherein said first operation information input and output means has a first input key portion for inputting operation information, said second operation information input and output means has a second input key portion for inputting operation information, and wherein in said first operation information input and output means, the input portion and the output portion are arranged along a horizontal direction as seen from the front side of said apparatus, and in said second operation information input and output means, the input portion and the output portion are arranged along a vertical direction.

* * * * *

UNITED STATES PATENT AND TRADEMARK OFFICE
CERTIFICATE OF CORRECTION

PATENT NO. : 6,819,891 B2
DATED : November 16, 2004
INVENTOR(S) : Suzuki

It is certified that error appears in the above-identified patent and that said Letters Patent is hereby corrected as shown below:

Column 8,
Line 18, "one" should read -- on --.

Signed and Sealed this

Fifteenth Day of November, 2005

JON W. DUDAS
*Director of the United States Patent and Trademark Office*